UNITED STATES PATENT OFFICE.

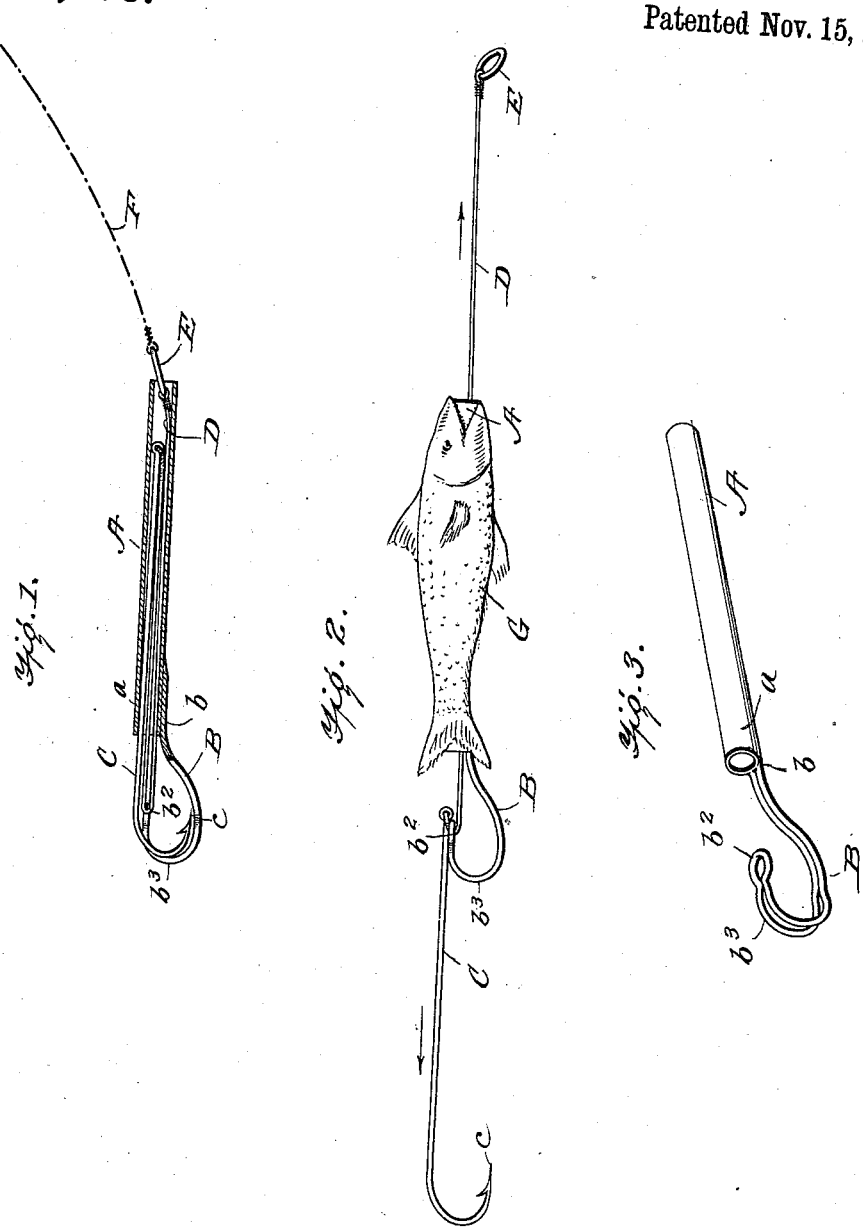

JAMES YELVERTON PAYTON, OF WALDRON, ARKANSAS, ASSIGNOR OF ONE-HALF TO JOHN DAVID BENSON, OF WALDRON, ARKANSAS.

FISH-HOOK.

975,993.  Specification of Letters Patent.  Patented Nov. 15, 1910.

Application filed October 28, 1909. Serial No. 525,011.

*To all whom it may concern:*

Be it known that I, JAMES YELVERTON PAYTON, a citizen of the United States, and resident of Waldron, in the county of Scott and State of Arkansas, have invented certain new and useful Improvements in Fish-Hooks, of which the following is a specification.

My invention relates to improvements in fishing devices, more especially in hooks, and it consists in the combinations, constructions and arrangements of parts herein described and claimed.

An object of my invention is to provide a hook which will move forward into the mouth of the fish when the latter is taking the bait, and hence will be more liable to engage the fish than the ordinary hook.

A further object of my invention is to provide a hook having simple operative mechanism for accomplishing the above result, which mechanism is incased in a short protecting tube and guard and is thus not liable to be broken by catching on weeds, rocks or projections.

Other objects and advantages will appear in the following specification and the novel features will be particularly pointed out in the appended claims.

My invention is illustrated in the accompanying drawings in which—

Figure 1 is a central section through the device showing the parts in their normal operative position. Fig. 2 is a view showing the device as used with artificial bait, the hook being in an extended position, and Fig. 3 is a perspective view of the tube with the attached guard.

In carrying out my invention, I provide a tube or casing A open at both ends. To one end $a$ of the tube I attach a guard, which I will denote in general by B, which is preferably a single wire doubled, and bent into the form shown. Fig. 3 shows that the ends of the wire are together at $b$. They may be soldered, or otherwise secured to the tube A. The doubled wire guard is bent into the form of a crane's neck and terminates in an eyelet $b^2$ in line with the axis of the tube. At $b^3$, it will be seen that the two wires of the guard are bent away from each other, to form lips to receive and hold the hook when set. The hook C is provided with a long shank to which a line D, a few inches long, is attached.

In assembling the parts thus described, the short line D is passed through the eyelet $b^2$, and on through the tube, and at its end a ring E is attached. When the hook C is pushed into the tube, the ring E will be drawn up to the end of the tube, as shown in Fig. 1. This is the normal or operative position of the parts, and it will be seen that the line D which is fastened to the end of the hook C extends forwardly to the eyelet $b^2$, thence rearwardly to the ring E.

The ring should be somewhat larger than the diameter of the tube, and the tube should be large enough to admit loosely the shank of the hook. When the hook is in use, the main line F is attached to the ring E. In setting the hook, the point $c$ is pressed up between the lips $b^3$ of the guard, which clamp the hook and hold it in position. These lips taper toward the eyelet $b^2$ as is clearly shown in the figure, and they may be made to clamp the hook more firmly if the latter is pressed toward the tapering part; thus the hook may be set more or less firmly as may be desired. The bait is placed on the hook, or it may be pressed against the lips of the guard and secured by being pierced by the hook in the act of "setting." It will be noticed that the tube serves two purposes, it protects the working parts and guides the forward motion of the hook. The guard serves six purposes, it protects the point of the hook, furnishes an eyelet at its extremity for the line, holds the hook in position when set and aids the hook in securing the bait; its lips engage the fish when taking the bait and direct the hook into its mouth.

When the fish seizes the bait and pulls slightly, the hook is thrust forward into his mouth. When a fish touches a bait, he presumes to be able to take it without further movement of his body forward, and herein lies a material advantage which I claim for this hook. It not only permits, but actually forces him to take the hook at the first slight pull, while his body is practically stationary. When he feels the baited hook reaching toward his gullet, he attributes his success to the force of his own suction. The action is different from that of a spring hook, but the movement is quick and when on a heavy "set" the hook jumps forward with surprising force. When the fish is taken, the tube drops out of the way against the ring and the hook may be extracted in the ordinary manner.

In Fig. 1, I have shown the main working parts in operative position. The device may be used in this manner, but it may be applied to artificial bait such as the minnow G, shown in Fig. 2. It is obvious that other artificial bait such as frogs, flies, and spoons might be used without departing from the spirit of the invention. The guard serves as a protection from the point of the hook so that the device when given a heavy "set" may be safely carried in the pocket.

I claim:

1. An automatic fish hook comprising a casing, a hook disposed within said casing, and means operated by the pull on the casing for projecting the hook from the casing.

2. The combination with a line, of an automatic fish hook comprising a cylindrical casing, a hook slidably disposed within said casing, a guard for holding the hook in operative position, and a flexible connection secured to the shank of the hook and being passed around the portion of the guard for projecting the hook forwardly, the end of said flexible connection being secured to the line.

3. The combination with a line, of an automatic fish hook comprising a cylindrical casing, a hook slidably disposed within said casing, a guard secured at one end of said casing and provided with lips arranged to engage said hook for holding it in operative position and having an eyelet, and a flexible connection secured to the shank of the hook and arranged to extend through said eyelet, said flexible connection being attached to said line.

4. The combination with a line, of an automatic fish hook comprising a cylindrical casing, a hook slidably disposed within said casing, a guard secured at one end of said casing, said guard comprising a doubled wire bent in goose-neck form, a portion of the bent wire forming lips for the engagement of the fish hook, and another portion forming an eyelet, a flexible connection secured to the end of the shank of the hook, said flexible connection being passed through said eyelet, and through the cylinder, and being attached at its opposite end to said line.

5. The combination with a line, of an automatic fish hook comprising a cylindrical casing, a hook slidably disposed within said casing, and means operated by a pull on the line for projecting the hook out of the casing.

6. The combination with a line, of an automatic fish hook comprising a cylindrical casing, a hook slidably disposed within said casing, and means connecting the line and hook for projecting the hook in the opposite direction from the line when the latter is pulled.

JAMES YELVERTON PAYTON.

Witnesses:
S. K. DUNCAN,
J. M. MARTIN.